Figure 1:
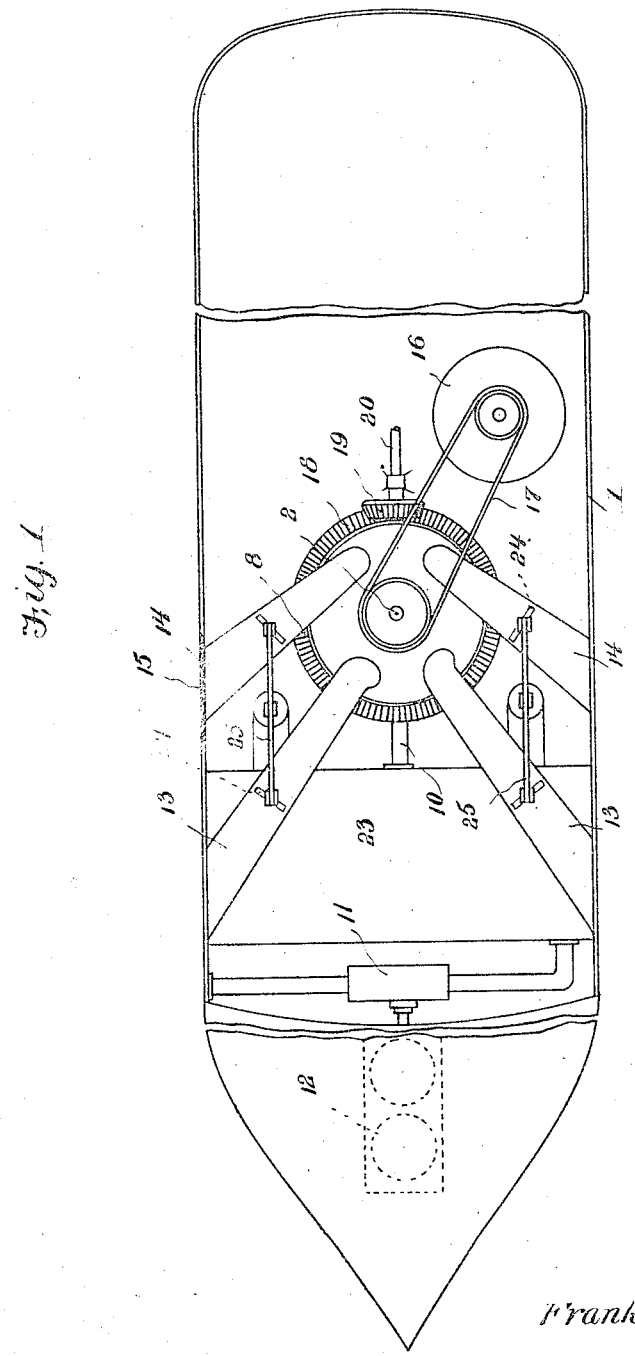

F. C. SAUER.
PROPULSION MECHANISM FOR VESSELS.
APPLICATION FILED AUG. 13, 1912.

1,069,479.

Patented Aug. 5, 1913.
2 SHEETS—SHEET 1.

Witnesses
William Smith
R. M. Smith

Inventor
Frank C. Sauer.

By Victor J. Evans
Attorney

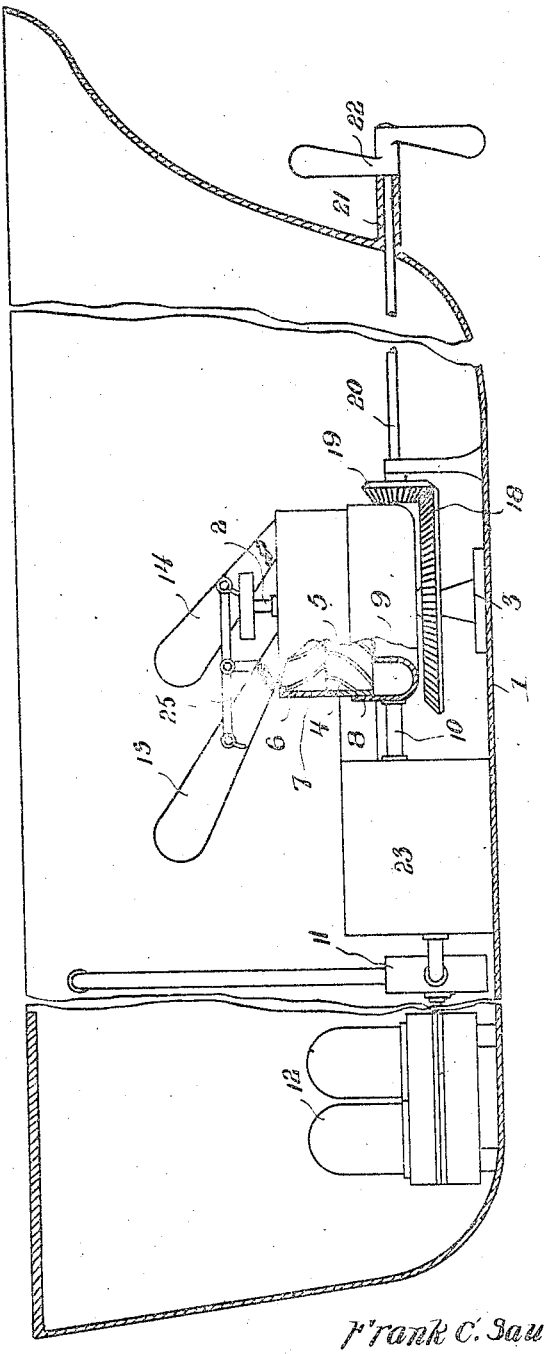

UNITED STATES PATENT OFFICE.

FRANK C. SAUER, OF HAMILTON, OHIO, ASSIGNOR OF ONE-THIRD TO ANTHONY B. HAFERTEPEN, OF HAMILTON, OHIO.

PROPULSION MECHANISM FOR VESSELS.

1,069,479.

Specification of Letters Patent.   Patented Aug. 5, 1913.

Application filed August 13, 1912. Serial No. 714,638.

*To all whom it may concern:*

Be it known that I, FRANK C. SAUER, a citizen of the United States, residing at Hamilton, in the county of Butler and State of Ohio, have invented new and useful Improvements in Propulsion Mechanism for Vessels, of which the following is a specification.

This invention relates to turbine engines for boats, the said turbine engine being supplied by water taken in through pipes leading from the turbine motor outward through the sides and preferably the forward portion of the boat, below the water line thereof, so that the motor or engine is driven by the inrush of water through such intake pipes.

A further object of the invention is to provide in conjunction with said turbine motor, a pump for exhausting the water from the engine, in order that the inrush of fresh water may actuate the engine. Power may be transmitted from the shaft of the turbine engine to any suitable devices, such as motors or pumps within the hull of the boat.

With the above and other objects in view, the invention consists in the construction, combination and arrangement of parts, as will be hereinafter more fully described, illustrated in the accompanying drawings, and pointed out in the claims hereunto appended.

In the drawings: Figure 1 is a plan view of a boat, partly in section, showing the turbine engine mounted therein. Fig. 2 is a vertical longitudinal section through the same.

Referring to the drawings, 1 designates the hull or body of a boat, in the bottom of which is arranged a turbine engine, comprising a central vertical shaft 2, seated in a bearing 3 fastened to the hull of the vessel. Mounted fast on the shaft 2 is a turbine wheel 4, embodying a series of turbine blades or vanes 5, which are set at such angles and distances apart as to coöperate in conjunction with a corresponding series of reversely pitched blades or vanes 6 in a stationary top 7 arranged just above the turbine wheel 4.

8 designates the casing or housing of the motor which is provided in the bottom thereof and beneath the turbine wheel 4 with an annular exhaust chamber 9, from which an exhaust pipe 10 leads off to a pump 11 which is geared to and driven by a gasolene or other internal combustion motor 12. Extending from the inlet portion of the turbine motor outward from opposite sides thereof are water intake pipes 13 and 14. These pipes lead through the sides of the hull of the vessel, and extend forward, so that the water passing inward through the intake pipes, the inlet ends of which are arranged below the water level, is forcibly projected between the fixed vanes 6 and thrown against the reversely inclined vanes 5 of the rotating portion of the turbine wheel. Screens 15 are arranged to cover the inlet ends of the intake pipes 13 and 14, so as to prevent any matter other than water passing therethrough.

16 designates a dynamo mounted at any suitable point in the hull of the vessel, and driven by a belt 17 extending around a pulley on the shaft of the turbine motor.

18 designates a bevel gear wheel fast on the shaft 2 of the turbine engine, the wheel 18 meshing with a corresponding bevel gear wheel 19 fast on the propelling wheel shaft 20, the latter being shown as extending through a bearing 21 and equipped with a propeller wheel 22 which may be of any suitable construction. This propeller wheel may be either in the form of a screw or paddle wheel, so as to impart forward motion to the boat.

In the preferred embodiment of this invention, the exhaust pipe 9 is led through a tank 23 arranged at a suitable point in the hull of the vessel, the pump 11 serving to exhaust the water from said tank. Furthermore, in each of the intake pipes 13 and 14, there is arranged a valve or gate 24, from which suitable connections 25 lead to a float in said tank, so that when the water level in said tank reaches a certain predetermined point, the valves or gates in the intake pipes 13 and 14 will be automatically closed, thereby preventing admission of additional water to the turbine motor, until the pump has had an opportunity to reduce the water level in the tank, whereupon the valves or gates in the intake pipes will be automatically opened, so as to allow the water to again pass to the turbine motor, setting the latter in operation.

In some cases, it may be desirable to provide very large water inlets, opening upward through the deck of the vessel, in which case the water may be pumped by suitable mechanism from the body of water in which the vessel floats, and discharged into said water inlets, finding its way to the said turbine wheel, which may be arranged to turn on horizontal or vertical axes. Any suitable form of pump, such as a plunger pump or elevating buckets may be used for carrying the water to and discharging the same to said inlets, extending upward through the deck of the vessel, and the action of the buckets may be regulated in accordance with the level of the water contained in the tank, hereinabove described.

What is claimed is:

The combination with a boat, of a turbine engine mounted therein, intake pipes leading from the outside of the boat body below the water line to the turbine engine, a water tank, a pipe from the engine exhaust to said tank, a pump for exhausting said tank, and valves controlling the intakes and in turn controlled by the water level in said tank.

In testimony whereof I affix my signature in presence of two witnesses.

FRANK C. SAUER.

Witnesses:
CHARLES E. SAUER,
PAUL KURRY.